July 18, 1944.   V. R. DESPARD   2,353,882
ELECTRIC WIRING APPARATUS
Filed March 20, 1942
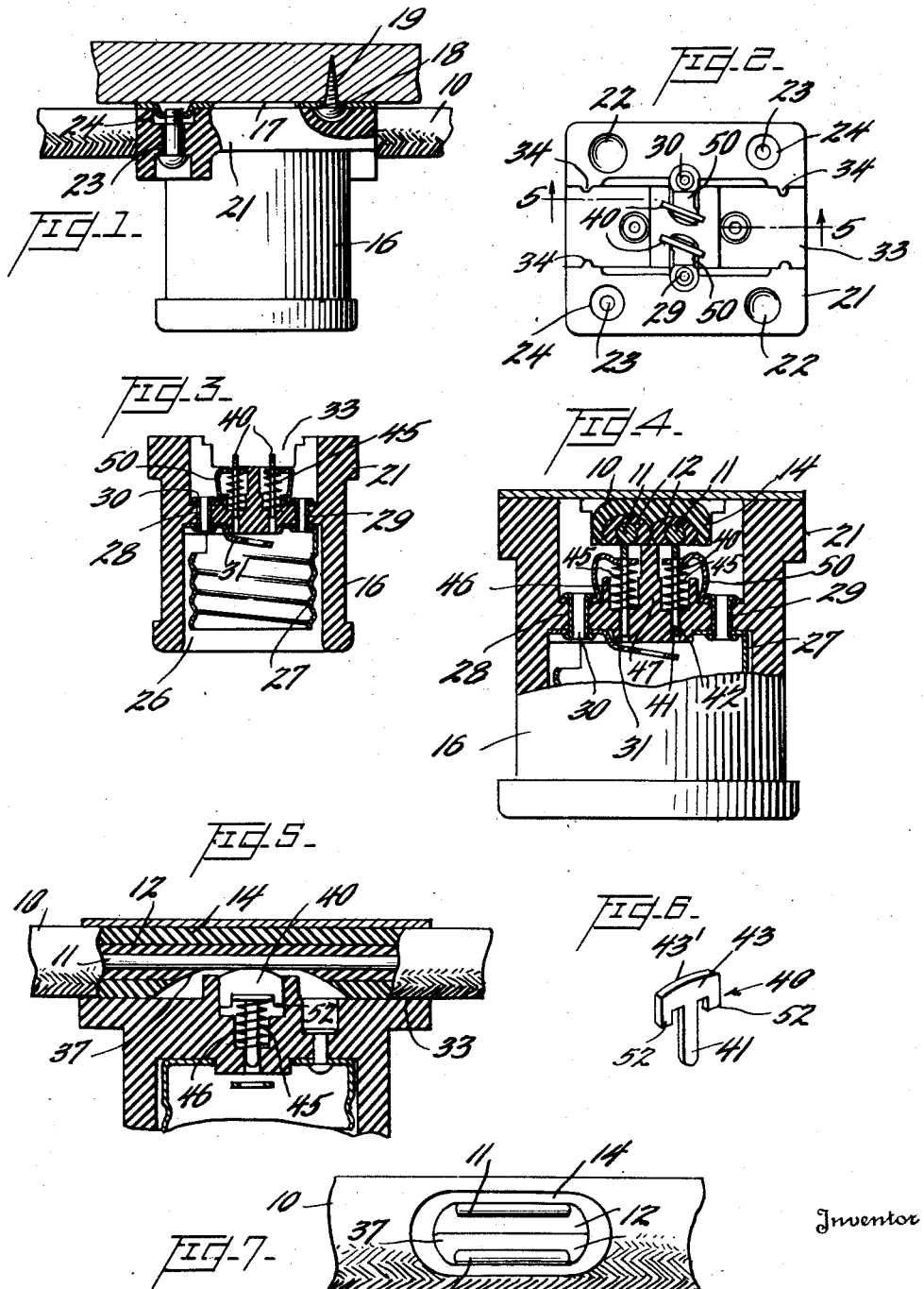

Patented July 18, 1944

2,353,882

UNITED STATES PATENT OFFICE 2,353,882

ELECTRIC WIRING APPARATUS

Victor R. Despard, Syracuse, N. Y., assignor to Pass & Seymour, Inc., Syracuse, N. Y., a corporation of New York Application March 20, 1942, Serial No. 435,575

4 Claims. (Cl. 173—338)

This invention is directed to electrical wiring systems and fittings for use with the same.

The purpose of this invention is to provide an extremely simple, cheap and effective wiring system using duplex non-metallic sheath cable and provides wiring appliances adapted for cooperation with such cable in the simplest possible manner, requiring neither the cutting of the cable nor the voluntary making of any connections. The system is so simple that, for instance, for use with a number of parallel connected lamp sockets, the uncut conductor is merely mounted on the surface, led through points where such sockets are desired and is secured in position. Thereafter at each socket position the insulation is slabbed off from the exposed cable surface down to the level of the conductors, a metal base plate is mounted beneath the cable at this point and the socket unit secured thereto automatically making the proper electrical contacts with the two conductors.

The invention is obviously applicable to other wiring appliances than that just described, but for the sake of simplicity will, in the appended drawing and following specification, be illustrated in but a single embodiment although the claims following the specification will be of such scope as to include obvious modifications and combinations.

In said drawing:

Figure 1 is a side elevation of an assembled lamp holder and section of duplex non-metallic sheath cable, a portion of the fitting being broken away to illustrate mounting and assembly means;

Figure 2 is a rear elevation of the major portion of the fitting shown separated from the backing plate;

Figure 3 is a transverse vertical section taken on line 3—3 of Figure 1, the backing plate being omitted;

Figure 4 is a view similar to Figure 3 but on an enlarged scale and showing the cable secured in position by the backing plate;

Figure 5 is a fragmentary section on the scale of Figure 4 taken on broken line 5—5 of Figure 2 and serving to illustrate, along with Figure 4, the electrical contact-making arrangements;

Figure 6 is a perspective view of one of the contact elements; and

Figure 7 shows in face view a length of duplex non-metallic sheath cable prepared for cooperation with a device such as shown in Figure 3, by the slabbing off of a portion of the insulation thereof.

With the present demand for low-cost housing, industrial structures, farm buildings and the like, there has arisen a concomitant demand for low-cost electrical wiring. The first step in satisfying this demand was taken in the recent approval by the Underwriters Laboratories of the use of non-metallic sheath cable of the duplex type. Such cable is permitted in most states and a number of cities for use at least above the first floor. However, when such cable is used with the conventional boxes and like fittings, the saving in time and labor is only that represented by the greater facility in which the sheath can be removed as compared with BX.

In accordance with the present invention, the non-metallic sheath cable can be used to advantage in any situation where the circuit does not have to be opened at the fitting for switching or branching. Contact by the wiring appliance with the conductors is automatically effected without severing the same by the mere act of mounting the fitting over the cable.

For a better understanding of the invention, reference should be had to the drawing where there is illustrated at 10, in Figures 1, 4, 5 and 7, a length of duplex non-metallic sheath cable in which the two solid conductors 11 are arranged side by side in parallel relation, individually insulated by appropriate material 12 and finally combined into a unit of generally flattened elliptical cross-section by a non-metallic sheath 14. Such material is relatively flexible and can be strung on the surface wherever desired and supported with simple clips or insulated staples.

A fitting for use with such cable in any position where the conductors do not have to be cut to accommodate circuit changes is illustrated as applied to such a cable in Figure 1 and comprises in general an insulation section 16 and a metal base or mounting plate 17. This base plate is of simple rectangular form and is provided adjacent diagonally opposite corners with openings 18 for the reception of mounting screws 19, preferably of the round-headed variety. At the remaining corners, cupped portions are perforated and threaded to receive attachment screws for securing the part 16 against the base plate as shown in Figure 1. Such screws extend through the base flange 21 on the insulation section which is of a configuration corresponding to that of the base plate.

Figure 2 illustrates the bottom face of the flange portion which cooperates with the base plate and illustrates the hollows 22 for accommodating the heads of screws 19. It likewise illustrates the perforations 23 for the passage of the mounting screws and having the counterbores 24 for the reception of the indented portions of the base plate. These cooperating parts insure rapid registry of the two sections of the wiring device for ease in inserting the assembling screws.

Since the wiring device illustrated is a lamp holder or socket, the remaining portion of the same is preferably circular in cross-section with the hollow outer end 26 thereof adapted to receive the screw shell contact 27. This is attached to the septum 28 integral with part 18 by a hollow rivet 29 in the usual manner. A corresponding hollow rivet 30 displaced 180° therefrom, secures the center contact 31 in position on the face of the septum.

The base of the insulating part is traversed longitudinally by a channel 33 of such width and depth as just to accommodate snugly a duplex non-metallic sheath cable. This permits the insulation portion to be mounted over a prepared portion of cable as illustrated in Figure 1, beneath which the base plate has been previously attached. The fitting parts may then be secured together by the assembling screws and the same is ready for use.

To insure a close fit between the walls of the channel 33 and the cable sheath for better protecting the contacting parts, which will subsequently be described, splines 34 are formed integral with the walls thereof and extend into the channel as shown in order to compress the cable insulation. These serve also to immobilize the cable in respect to the fitting.

Before mounting the receptacle portion of the fitting over the cable, the insulation of the sheath and of the individual conductors is slabbed off as illustrated at 37 in Figures 4, 5 and 7. This is simply accomplished by a single cut with a sharp knife which removes all insulation down to and flush with the surfaces of the two solid conductors 11, cleaning and exposing them for engagement with a pair of spring-pressed contact elements 40 mounted on the under-side of the septum 28.

These elements 40 are best shown in Figure 6 and are stampings of heavy sheet metal of T-shape, each including a shank 41 slidably mounted in a correspondingly shaped slot 42 in the septum and a head 43 having a slightly convex surface 43' for actual engagement with the bare wire surface just described, as clearly illustrated in Figures 4 and 5. The slots 42 and hence the shanks of the pair of T's are spaced apart exactly the center-to-center distance between the conductors 11 of the cable but, to insure against slight inequalities and to prevent the heads from slipping laterally off the conductors, each of them is twisted or set with its plane at an angle of approximately 15° to the axis of the conductor, as clearly seen in Figure 2 whereby it extends diagonally across the conductor, effecting a more secure and permanent contact.

Each T contact is forcibly projected for engagement with its conductor by a helical spring 45 surrounding the shank of the same and housed in a counter-bore 46 of the slot 42. A baffle wall 47 between the springs insures against short circuit.

Each T contact is connected to the adjacent hollow rivet 29 or 30 by means of a flexible jumper strap 50 secured under the rear head of the rivet, bent into a relatively flexible loop and having a perforation in its outer end engaging over the shank 41 of the corresponding contact between the upper end of the spring and the under-surface of the head. If desired, the depending lugs 52 at the ends of the head may be pressed inwardly after the jumper is assembled thereon to hold the parts together whereby the contacts are insured against falling out during shipment and handling prior to assembly over the cable.

Those skilled in the art will appreciate the simplicity of construction and the ease of assembly and the labor saving characteristics of the whole system and will realize that other fittings may be substituted for the screw shell lamp holder without the exercise of invention. It is expected that this form of fitting will be as useful with duplex solid conductors as the pin type socket has proven with pairs of individual, stranded conductors.

Having thus described the invention, what is claimed as new and desired to be secured by Letters Patent is:

1. An electric fitting for assembly with a duplex cable of the type having parallel solid conductors enveloped in a non-metallic sheath, said fitting comprising mounting and contact carrying members adapted to be secured together and defining, when secured together, a cable-receiving channel the midportion of which is of smaller cross section than the end portions so as to be able to receive only a slabbed off portion of cable, the portions of the channel to either side of said midportion being adapted to receive and closely embrace unmutilated portions of such cable, and contacts mounted upon said contact carrying member for automatically engaging the solid conductors of the cable at the slabbed off portion when said members are assembled.

2. The combination set forth in claim 1 in which the cable-receiving channel defined by said members when assembled is restricted at its midportion by an insulating baffle wall rigidly supported by said contact carrying member, the conductor engaging contacts being disposed upon opposite sides of said baffle wall.

3. The combination set forth in claim 1 in which said cable-receiving channel is formed entirely in one of said members, the other member comprising a flat closure therefor, an integral portion of the member in which the channel is formed effecting the restriction of such channel at its midportion.

4. The combination set forth in claim 1 in which the contacts for engaging the conductors of the slabbed off cable comprise sheet metal members disposed in planes inclined to the longitudinal axis of the channel, for the purpose set forth.

VICTOR R. DESPARD.